US011832129B2

(12) United States Patent
Kanamarlapudi et al.

(10) Patent No.: US 11,832,129 B2
(45) Date of Patent: Nov. 28, 2023

(54) PDCP REORDER TIMER EXPIRY ENHANCEMENTS DUE TO SCHEDULER VARIATIONS IN DUAL CONNECTIVITY

(71) Applicant: QUALCOMM Incorporated, San Diego, CA (US)

(72) Inventors: Sitaramanjaneyulu Kanamarlapudi, San Diego, CA (US); Leena Zacharias, San Jose, CA (US); Aditya Namjoshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 286 days.

(21) Appl. No.: 17/401,187

(22) Filed: Aug. 12, 2021

(65) Prior Publication Data
US 2022/0272570 A1     Aug. 25, 2022

Related U.S. Application Data

(60) Provisional application No. 63/151,554, filed on Feb. 19, 2021.

(51) Int. Cl.
*H04W 28/06* (2009.01)
*H04W 72/1263* (2023.01)
(Continued)

(52) U.S. Cl.
CPC ........... *H04W 28/06* (2013.01); *H04L 1/1642* (2013.01); *H04W 72/0446* (2013.01); *H04W 72/1263* (2013.01)

(58) Field of Classification Search
CPC ............. H04W 28/06; H04W 72/0446; H04W 72/1263; H04L 1/1642
(Continued)

(56) References Cited

U.S. PATENT DOCUMENTS

2020/0100142 A1   3/2020   Kim

FOREIGN PATENT DOCUMENTS

| GB | 2561545 A | * | 10/2018 | ........... H04L 1/1841 |
| GB | 2561545 A |   | 10/2018 |
| WO | 2019028587 A1 |   | 2/2019 |

OTHER PUBLICATIONS

International Search Report and Written Opinion—PCT/US2022/012564—ISA/EPO—dated May 3, 2022.

* cited by examiner

*Primary Examiner* — Intekhaab A Siddiquee
(74) *Attorney, Agent, or Firm* — Procopio, Cory, Hargreaves & Savitch

(57) ABSTRACT

A configuration to adjust expiration of a PDCP reorder timer based on scheduler variations in dual connectivity. The apparatus receives, from a base station, a plurality of data packets. The plurality of data packets received from a first path and a second path. The apparatus detects at least one packet of the plurality of data packets at a PDCP is dropped based on an OOW. The apparatus determines a scheduling gap between the first path and the second path. The apparatus determines a timing relationship between the UE, the first path, and the second path. The apparatus determines consecutive sequence numbers associated with packets corresponding to the frame numbering sequence of the first path and the frame numbering sequence of the second path and a respective associated time. The apparatus adjusts a reorder timer based on the scheduling gap between the first path and the second path.

30 Claims, 9 Drawing Sheets

(51) Int. Cl.
*H04W 72/0446* (2023.01)
*H04L 1/1607* (2023.01)

(58) Field of Classification Search
USPC .......................................................... 370/329
See application file for complete search history.

| FRAME | PATH | STATUS | SN |
|---|---|---|---|
| 50 | 1 | DELIVER | 100 |
| 51 | 1 | DELIVER | 101 |
| 52 | 1 | DELIVER | 102 |
| 53 | 1 | DELIVER | 103 |
| 60 | 2 | DELIVER | 320 |
| 61 | 2 | DELIVER | 321 |
| 62 | 2 | DELIVER | 322 |
| 54 | 1 | DROP OOW | 104 |
| 55 | 1 | DROP OOW | 105 |
| 63 | 2 | DELIVER | 324 |
| 64 | 2 | DELIVER | 325 |
| 56 | 1 | DROP OOW | 106 |
| 57 | 1 | DROP OOW | 107 |
| 65 | 2 | DELIVER | 326 |

FIG. 4

| TIME | SN | PATH |
|---|---|---|
| X | PDCP SN1 | 2 |
| X+1 | PDCP SN3 | 2 |
| X+2 | PDCP SN5 | 2 |
| X+5 | PDCP SN2 | 1 |
| X+6 | PDCP SN4 | 1 |

FIG. 5

PDCP REORDER TIMER EXPIRY ENHANCEMENTS DUE TO SCHEDULER VARIATIONS IN DUAL CONNECTIVITY

CROSS REFERENCE TO RELATED APPLICATION(S)

This application claims the benefit of and priority to U.S. Provisional Application Ser. No. 63/151,554, entitled "PDCP Reorder Timer Expiry Enhancements due to Scheduler Variations in Dual Connectivity" and filed on Feb. 19, 2021, which is expressly incorporated by reference herein in its entirety.

TECHNICAL FIELD

The present disclosure relates generally to communication systems, and more particularly, to a configuration to adjust expiration of a packet data convergence protocol (PDCP) reorder timer based on scheduler variations in dual connectivity.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus receives, from a base station, a plurality of data packets, wherein the plurality of data packets is received from a first path and a second path. The apparatus detects at least one packet of the plurality of data packets at a packet data convergence protocol (PDCP) is dropped based on an out of order window (OOW). The apparatus determines a scheduling gap between the first path and the second path. To determine the scheduling gap between the first path and the second path, the apparatus determines a timing relationship between the UE, the first path, and the second path. A frame numbering sequence of the first path, a frame numbering sequence of the second path, and a timestamp of the UE are aligned. To determine the scheduling gap between the first path and the second path, the apparatus determines consecutive sequence numbers associated with packets corresponding to the frame numbering sequence of the first path and the frame numbering sequence of the second path and a respective associated time. The apparatus adjusts a reorder timer based on the scheduling gap between the first path and the second path.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 is a diagram illustrating an example of received data packets.

FIG. 5 is a diagram illustrating an example of received data packets.

DETAILED DESCRIPTION

Figure 1:
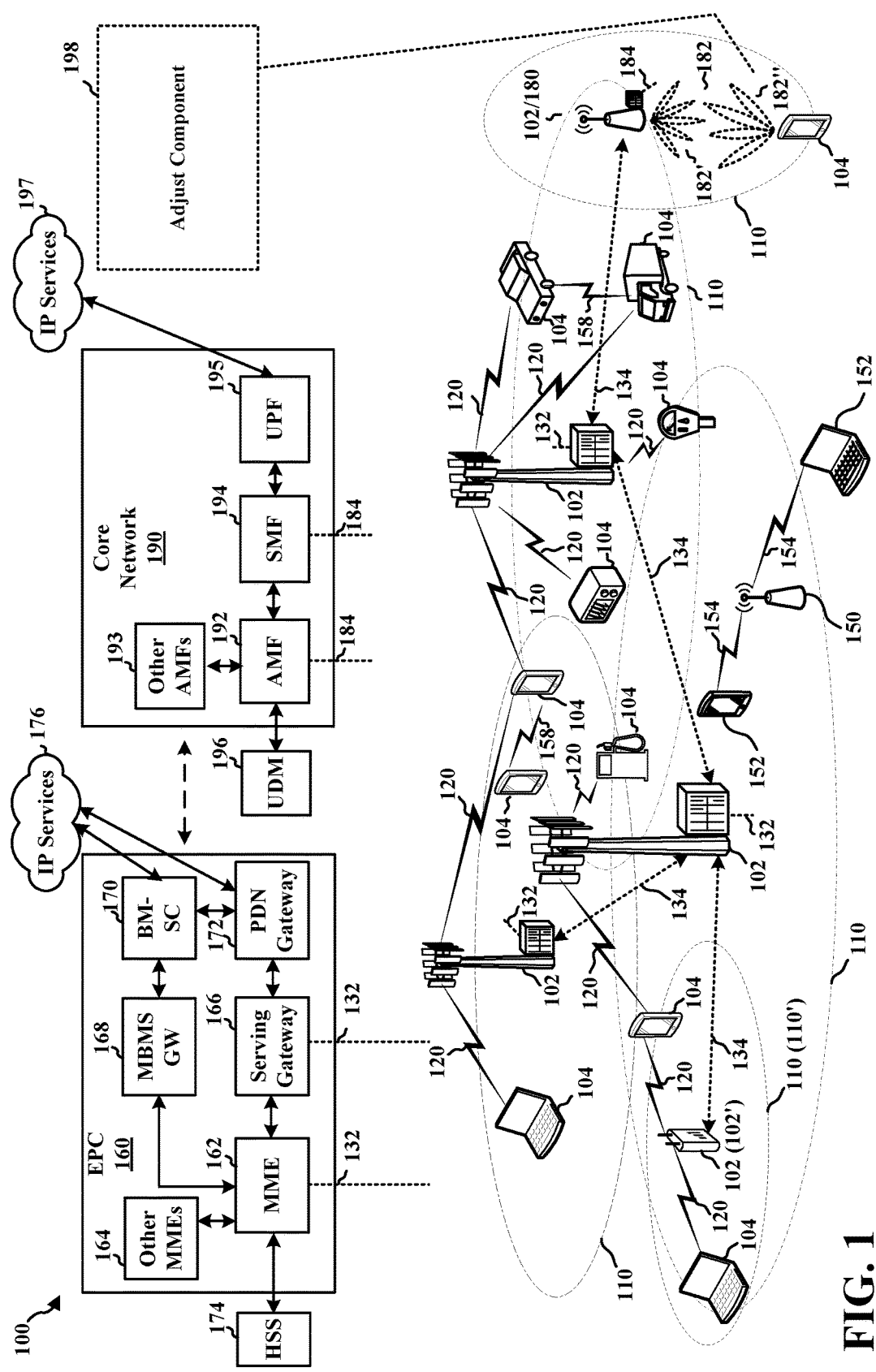
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. The base station may also be part of a non-terrestrial network (NTN). For example, the NTN may comprise satellite communication networks utilizing spaceborne platforms including low Earth orbiting (LEO) satellites, medium Earth orbiting (MEO) satellites, and/or geosynchronous Earth orbiting (GEO) satellites. In some instances, NTN may be utilized with terrestrial networks in dual connectivity. Dual connectivity allows a UE to simultaneously transmit and receive data on multiple component carriers from two cell groups via a master node and a secondary node. In some instances, the master node may comprise a terrestrial network and the secondary node may comprise NTN, or vice versa. In some instances, the master node may comprise NTN and the secondary node may comprise NTN. For example, the master node may comprise a fast satellite LEO and the secondary node may comprise a slow satellite MEO or GEO, or vice versa. In some instances, the base station operating in dual connectivity may be part of a private network, a public network, a terrestrial network, an NTN, or combinations thereof.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to adjust a PDCP reorder timer based on scheduler variations in dual connectivity. For example, the UE 104 may comprise an adjust component 198 configured to adjust a PDCP reorder timer based on scheduler variations in dual connectivity. The UE 104 may receive, from a base station 102/180, a plurality of data packets, wherein the plurality of data packets is received from a first path and a second path. The UE 104 may detect that at least one packet of the plurality of data packets at a PDCP is dropped based on OOW. The UE 104 may determine a scheduling gap between the first path and the second path. To determine the scheduling gap, the UE 104 may determine a timing relationship between the UE, the first path, and the second path, wherein a frame numbering sequence of the first path, a frame numbering sequence of the second path, and a timestamp of the UE are aligned. To further determine the scheduling gap, the UE 104 may determine consecutive sequence numbers associated with packets corresponding to the frame numbering sequence of the first path and the frame numbering sequence of the second path and a respective associated time. The UE 104 may adjust a reorder timer based on the scheduling gap between the first path and the second path.

Although the following description may be focused on 5G NR, the concepts described herein may be applicable to other similar areas, such as LTE, LTE-A, CDMA, GSM, and other wireless technologies.

Figure 2:
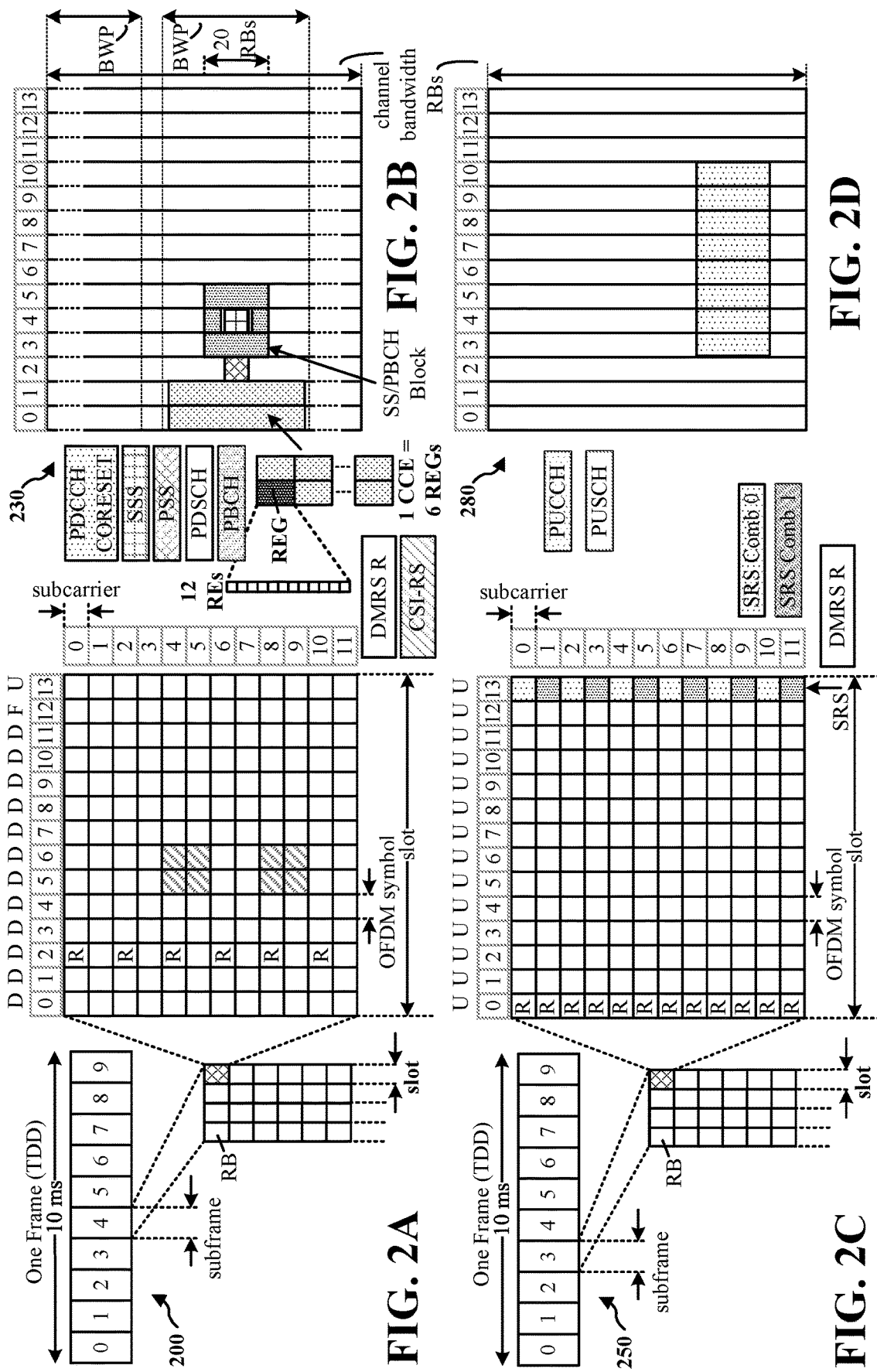
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
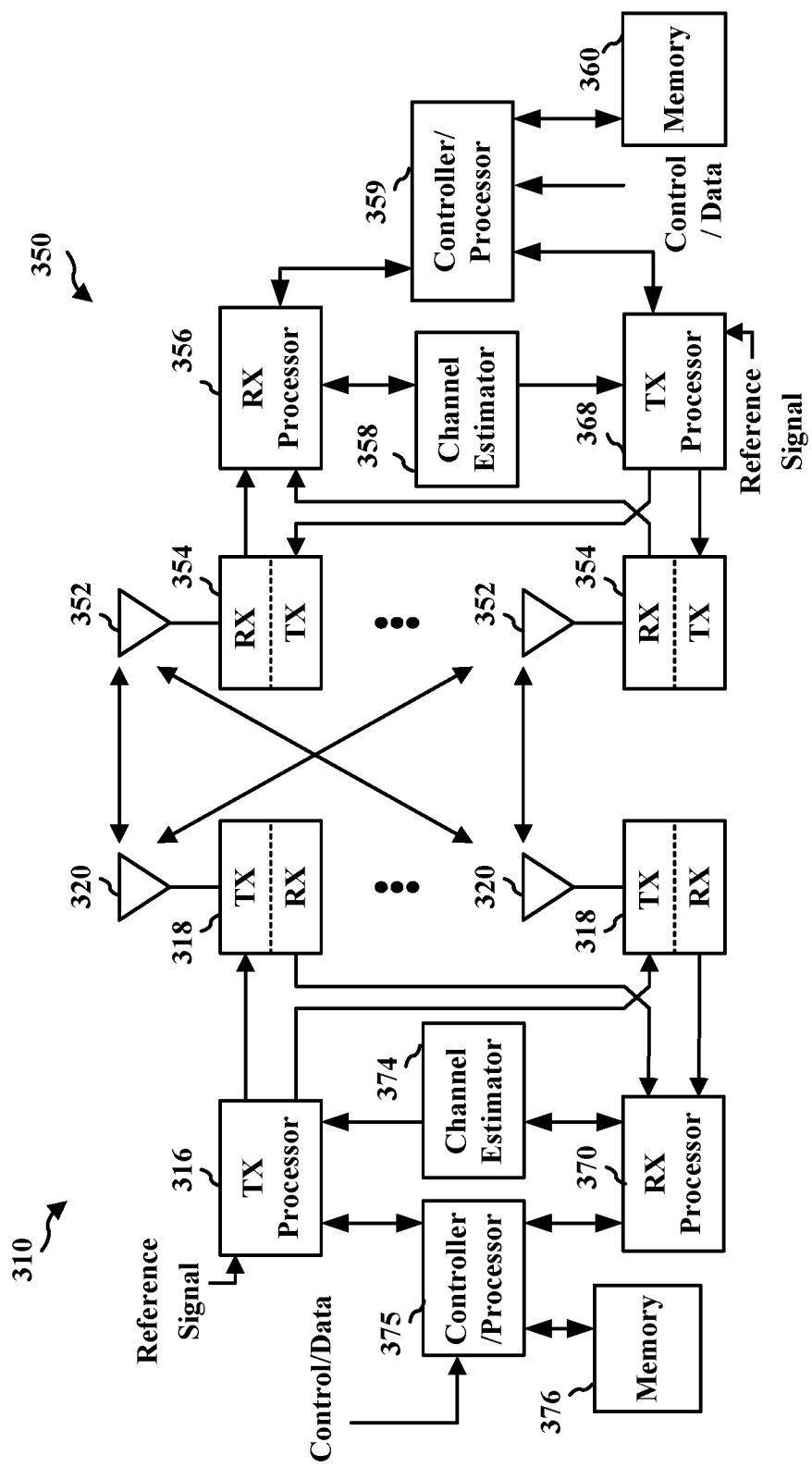
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

In some wireless communication systems, a receiver device (e.g., UE) may utilize a PDCP reordering timer as a mechanism to handle a window mechanism for incoming traffic from one or more radio link control (RLC) entities. The receiver device may be configured in a single RLC configuration or a dual RLC configuration. Some wireless communication systems (e.g., NR) may allow the delivery of RLC packets as the packets are received, without waiting for an ordered or in-sequence packets before allowing the packets to be sent to higher layers. However, some wireless communication systems (e.g., LTE) may require that the delivery of RLC packets be in a sequential order. In such instances, the PDCP of the receiver device may build a reordering window upon detection of an expected packet of a sequence of packets not being received (e.g., missing packet). The detection of the missing packet or a hole in the sequence of packets may trigger the start of the reordering timer. The PDCP of the receiver device may temporarily hold the packets, received after the detection of the missing packet, in buffer while starting the reordering timer to allow a period of time for the receipt of the missing packet to complete the sequence of the packets in the buffer.

Upon the expiration of the reordering timer, the packets received after the missing packet which are in-sequence are released for delivery, until a subsequent missing packet is detected and/or identified. Before the expiration of the reordering timer, if the missing packet is received, then all of the in-sequence packets held in the buffer may be released for deliver, until the subsequent missing packet is detected and/or identified.

The reordering timer may be useful to cover multiple issues in the packet arrival at the PDCP of the receiver device. Delays in the receipt of packets may occur for many different reasons. For example, at least some delays may be related due to HARQ retransmission delays specific to one path, RLC retransmission delays specific to one path, connection link lost packets which may be recovered and later transmitted as part of an RLC sequence number, or scheduling delays between a first path and a second path when configured in a dual connectivity mode of the data transfer. In some instances, for example, when delays may be related to scheduling delays between the first path and the second path in dual connectivity mode, the amount of data split between the two paths may cause delays, on a given path (e.g., first path or second path) the data transfer may be front loaded with a first set of packets from the given path or may be rear loaded with a last set of packets from the given path. In some instances, the delay may be due to the amount of dynamic loading and/or the amount of buffer that may be configured and/or added for a given path. In yet some instances, the delay may be due to scheduling due to loading on the cell, such that high priority data is given priority, while other data may be buffered for a given device on the network side.

FIG. 4 is a diagram 400 illustrating an example of received data packets. The diagram 400 may provide an example of a log of received data packets at a receiving device (e.g., UE) for a period of time. The frame 402 may correspond to a frame number of the received data stream, the path 404 may correspond to the path upon which the data packet is received from, the status 406 may correspond to the status of the received data packet, and sequence number (SN) 408 may correspond to the SN of the received data packet. With reference to the diagram 400 of FIG. 4, four sequential data packets are received from path 1, where the data packets have an SN of 100-103. These four data packets are received in order or sequence, and as such are released for delivery and have a status 406 of deliver. The following data packets received are from path 2 having an SN of 320-322. However, the next expected SN should be 104, since the SN 103 was the last received data packet received. At this point, the PDCP may indicate that data packet SN 104 is missing and trigger the reordering timer. The length of time of the reordering time may be a predetermined set value that provides a window of time to allow for the missing data packet of the sequence to be received (e.g., SN 104). At the end of the reordering timer, the packets that have been received and held in the buffer may be released. For example, the packets from path 2 having SN 320-322 are held in the buffer and are released for delivery when the reordering timer has expired. In the example of FIG. 4, the packets from path 2 having SN 320-322 are thereby released upon the expiration of the reordering timer and have a status 406 of deliver.

In some instances, the missing data packet of the sequence (e.g., SN 104) may be received after the expiration of the reordering timer. For example, data packet 410 and 412 may be the two next data packets of the sequence (e.g., SN 104, 105).

However, since the reordering timer has ended the receiving device assumes that the missing data packet of the sequence (e.g., SN 104) is not expected to be received. As such, the missing data packet (e.g., SN 104) is no longer an expected data packet reception. Instead, since the packets from path 2 having SN 320-322 have been received, the expected SN has been changed to follow the SN indicated by the packets received from path 2. As such, there is a jump in the expected SN at the PDCP of the receiving device. Thus, if the missing data packet of the sequence (e.g., SN 104) is received after the expiration of the reordering timer, such missing data packet may be held in buffer until the expiration of the reordering timer. Upon expiration of the reordering timer, the missing data packet (e.g., SN 104) held in buffer will be dropped at the PDCP as being identified as a packet received during an out of order window (OOW). The packet 412 having the SN 105 may be received in-sequence after the packet 410 having the SN 104, but since SN 104 is no longer an expected data packet to be received, any packets from path 1 may be identified as non-sequential packets due to the jump in the expected SN based on the packets received at the PDCP from path 2. As such, the packets 412, 414, and 416, although received in-sequence at the RLC level, may be dropped at the PDCP level as identified as out of order. The data packets received from path 2 that are received having SN of 324, 325, 326 may be considered as being in-sequence at the PDCP due to the jump in the SN.

The receipt of the packets 410, 412, 414, 416 in-sequence may indicate that there are no issues with the path 1, but may be related to a scheduling issue at the network. The packets are being properly received from the RLC perspective, but the unnecessary expiration of the reordering timer causes the properly received packets to be dropped based on OOW at the PDCP level while the packets are in transition. This may be an issue with the network scheduling of the packets in terms of how the packets from the different paths are spaced.

Aspects provided herein provide a configuration to adjust a PDCP reordering timer based on scheduler variations in dual connectivity. For example, a receiving device (e.g., UE) may be configured to adjust the PDCP reordering timer based on a scheduling gap between the first path and the second path. Adjusting of the reordering timer based on the scheduling gap may provide for additional time to receive a missing data packet, identified at the PDCP level, yet received in-sequence at the RLC level. At least one advantage of the disclosure is that the adjusted reordering timer may compensate for scheduling delays between the first path and the second path, which may be due to the configuration of the data transfer of the data packets from the first path and the second path.

FIG. 5 is a diagram 500 illustrating an example of received data packets. The diagram 500 may provide an example of a log of received data packets at a receiving device (e.g., UE). The time 502 may correspond to a timestamp at the receiving device, the SN 504 may correspond to a SN of a packet received at the PDCP, and path 506 may correspond to the path upon which the data packet is received from. With reference to the diagram 500 of FIG. 5, the packets 508, 510, 512, 514, 516 may be received out of sequence, at the PDCP level, due in part to a scheduling delay between the path 1 and the path 2. For example, the packet 510 having an SN of PDCP SN3 from path 2 may indicate that packet 514 having an SN of PDCP SN2 from path 1 is already submitted to path 1 and may have been delayed for a period of time. Further, the packet 512 having an SN of PDCP SN5 from path 2 may indicate that packet 516 having an SN of PDCP SN4 may have already been provided to path 1 and also got delayed by a similar period of time as packet 514. The UE may determine the scheduling delay based, in part, on the difference of when sequential packets are received across different paths. For example, the UE may compare the arrival times of packet 510 and packet 514, and the UE may determine that packet 510 was received at time X+1 having an PDCP SN3 and that packet 514 was received at time X+5 but has a PDCP SN2. The packet 514 is in sequence prior to packet 510 but was received after 510 due to a scheduling delay between the different paths, such that the timing difference between packets 514 and 510 may be a scheduling delay between the first path and second path, such that this scheduling delay may be added to the reorder timer to compensate for the scheduling delay between the first path and the second path on the network side.

Figure 6:
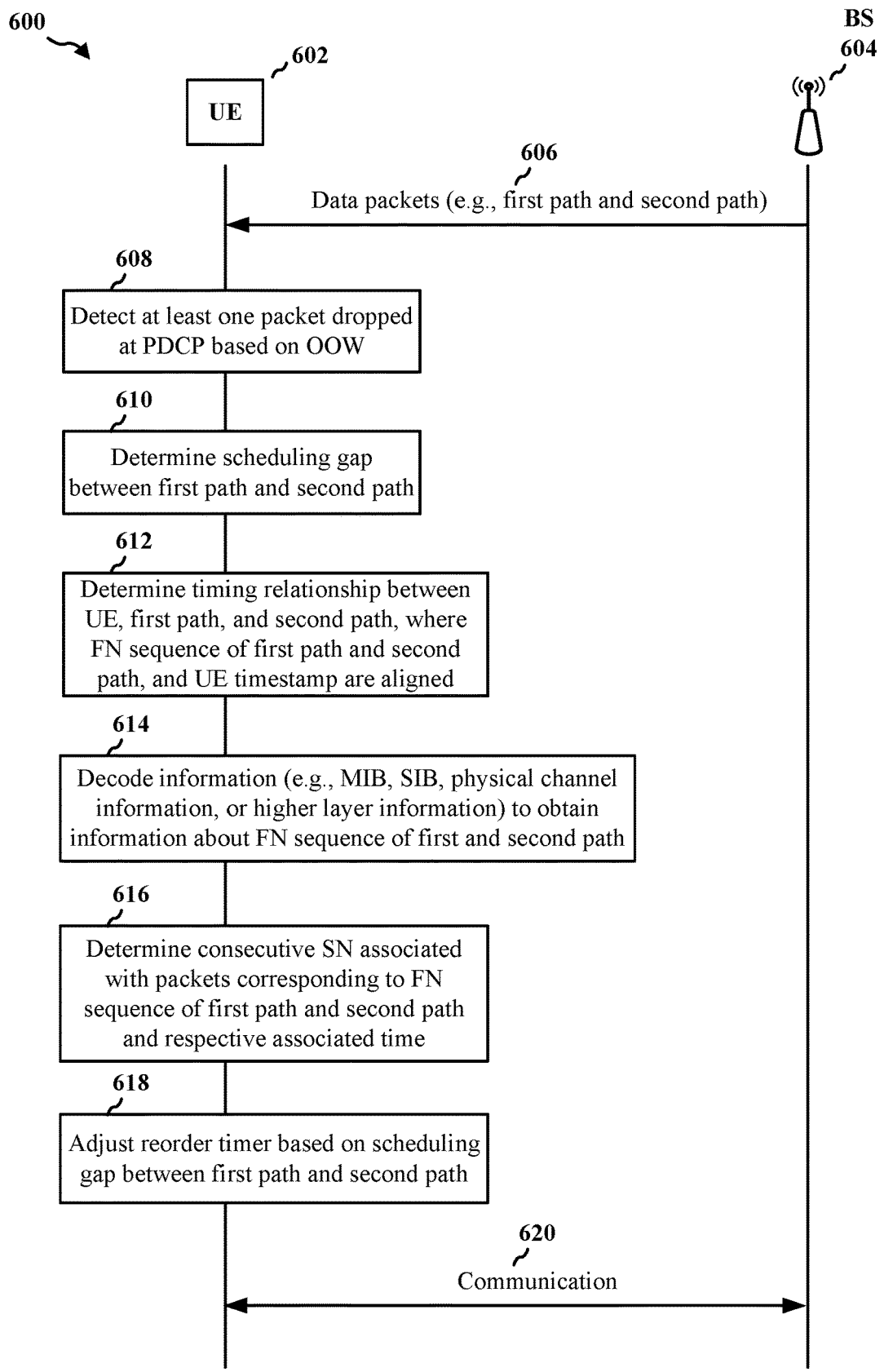
FIG. 6 is a call flow diagram of signaling between a UE and a base station in accordance with certain aspects of the disclosure.

FIG. 6 is a call flow diagram 600 of signaling between a UE 602 and a base station 604. The base station 604 may be configured to provide at least one cell. The UE 602 may be configured to communicate with the base station 604. For example, in the context of FIG. 1, the base station 604 may correspond to base station 102/180 and, accordingly, the cell may include a geographic coverage area 110 in which communication coverage is provided and/or small cell 102' having a coverage area 110'. Further, a UE 602 may correspond to at least UE 104. In another example, in the context of FIG. 3, the base station 604 may correspond to base station 310 and the UE 602 may correspond to UE 350.

As illustrated at 606, the base station 604 may transmit a plurality of data packets to the UE 602. The UE 602 may receive the plurality of data packets from the base station 604. The plurality of data packets may be received from a first path and a second path. In some aspects, the first path and/or the second path may comprise at least one of a radio access technology (RAT), a component carrier (CC), a band, or a leg. In the diagram 600 of FIG. 6, the base station 604 may be configured to transmit the plurality of data packets from the first path and the second path. In some aspects, the base station 604 may transmit a plurality of data packets from the first path or the second path, while another base station (not shown) may transmit a plurality of data packets from the other of the first path or the second path. In some aspects, the first path may comprise a first wireless communication system and the second path may comprise a second wireless communication system.

As illustrated at 608, the UE 602 may detect at least one packet of the plurality of data packets at a packet data convergence protocol (PDCP) being dropped. The at least one packet may be dropped at the PDCP based on an out of order window (OOW). In some aspects, the at least one packet may be dropped based on the OOW in response to an expiration of a reorder timer. The reorder timer may be started in response to receiving at least one packet out of sequence. The reorder timer may provide a period of time to allow for receipt of a missing packet to complete a sequence of packets.

As illustrated at 610, UE 602 may determine a scheduling gap between the first path and the second path. In some aspects, the scheduling gap between the first path and the second path may be based on a consecutive sequence number of the packets corresponding to a frame numbering sequence of the first path and the frame numbering sequence of the second path and a respective associated time. The respective associated time may correspond to a timestamp of the UE. In some aspects, the consecutive sequence numbers associated with packets corresponding to the first path and the second path with respect to a local time or timestamp of the UE may indicate a schedule gap from an inter-RAT perspective. For example, the inter-RAT perspective may comprise the first path and the second path. In some aspects, the scheduling gap between the first path and the second path is dynamic. As such, the scheduling gap may increase or decrease over time.

As illustrated at 612, to determine the scheduling gap between the first path and the second path, the UE 602 may determine a timing relationship between the UE, the first path, and the second path. The timing relationship may be determined in instances where a frame numbering sequence of the first path, a frame numbering sequence of the second path, and the timestamp or local time of the UE are aligned. In some aspects, the frame numbering sequence of the first path may be different from at least the frame numbering sequence of the second path or the timestamp or local time of the UE. In some aspects, the first path, the second path, and/or the UE may utilize different timing mechanisms that may not be aligned, synchronized, similar, or compatible. In such instances, receipt of data packets from the first path or second path may be sequential, but may appear to be out of order or sequence due in part to the first path and second path utilizing different timing mechanisms.

As illustrated at 614, to determine the timing relationship between the UE, the first path, and the second path, the UE 602 may decode information transmitted by the base station to obtain relevant information related to the first path and/or the second path. In some aspects, to determine the timing relationship between the UE, the first path, and the second path, the UE 602 may decode at least a master information block (MIB) to obtain information about the frame numbering sequence of the first path and/or the frame numbering sequence of the second path. For example, the MIB may include information about the frame numbering for a specific path (e.g., first path or second path) along with a timestamp of the UE. Having this information across the two paths may provide a specific path frame numbering sequence at a given time of the UE. This relationship allows for the UE to determine a synchronization of the sequence of data packets for each respective path, which may allow the UE to recognize the sequence of received data packets across different paths. The different paths may use different frame numbering sequences and the UE determining the timing relationship between the different frame numbering sequences may allow the UE to determine the scheduling gap between the first path and the second path. In some aspects, the information the UE may decode at least one of a system information block (SIB), physical channel information, or higher layer information to obtain the information about the frame numbering sequence of the first path and/or the frame numbering sequence of the second path. In some aspects, the timing relationship may be based on the frame numbering sequence of the first path and the frame numbering sequence of the second path.

As illustrated at 616, the UE 602 may determine the consecutive sequence numbers associated with packets corresponding to the frame numbering sequence of the first path, the frame numbering sequence of the second path, and a respective associated time. The UE may determine the consecutive sequence numbers to further determine the timing relationship between the UE, the first path, and the second path. For example, the UE may derive the consecutive PDCP SN associated with an RLC packet scheduled As illustrated at 618, the UE 602 may adjust a reorder timer based on the scheduling gap between the first path and the second path. In some aspects, the adjustment of the reorder timer may be dynamic. As such, the adjustment of the reorder timer may increase or may decrease over time. The adjustment of the reorder timer allows the UE to extend the expiration of the reorder timer to allow for scheduling and/or transmission variations between the first path and the second path, which may reduce and/or avoid lost or dropped packets at the PDCP based on the OOW. The adjustment of the reorder time may allow for the delivery of out of sequence packets to be delivered to upper layers, which may reduce packet loss and increase radio resource and/or spectral efficiency at the UE side. In addition, adjusting the reorder timer may assist in avoiding excessive retransmissions due to dropped packets at the PDCP and improve overall throughput.

As illustrated at 620, the UE 602 may continue to communicate with the base station 604 in response to adjusting the reorder timer. For example, the UE 602 may continue to receive a plurality of data packets from the first path and/or the second path.

Figure 7:
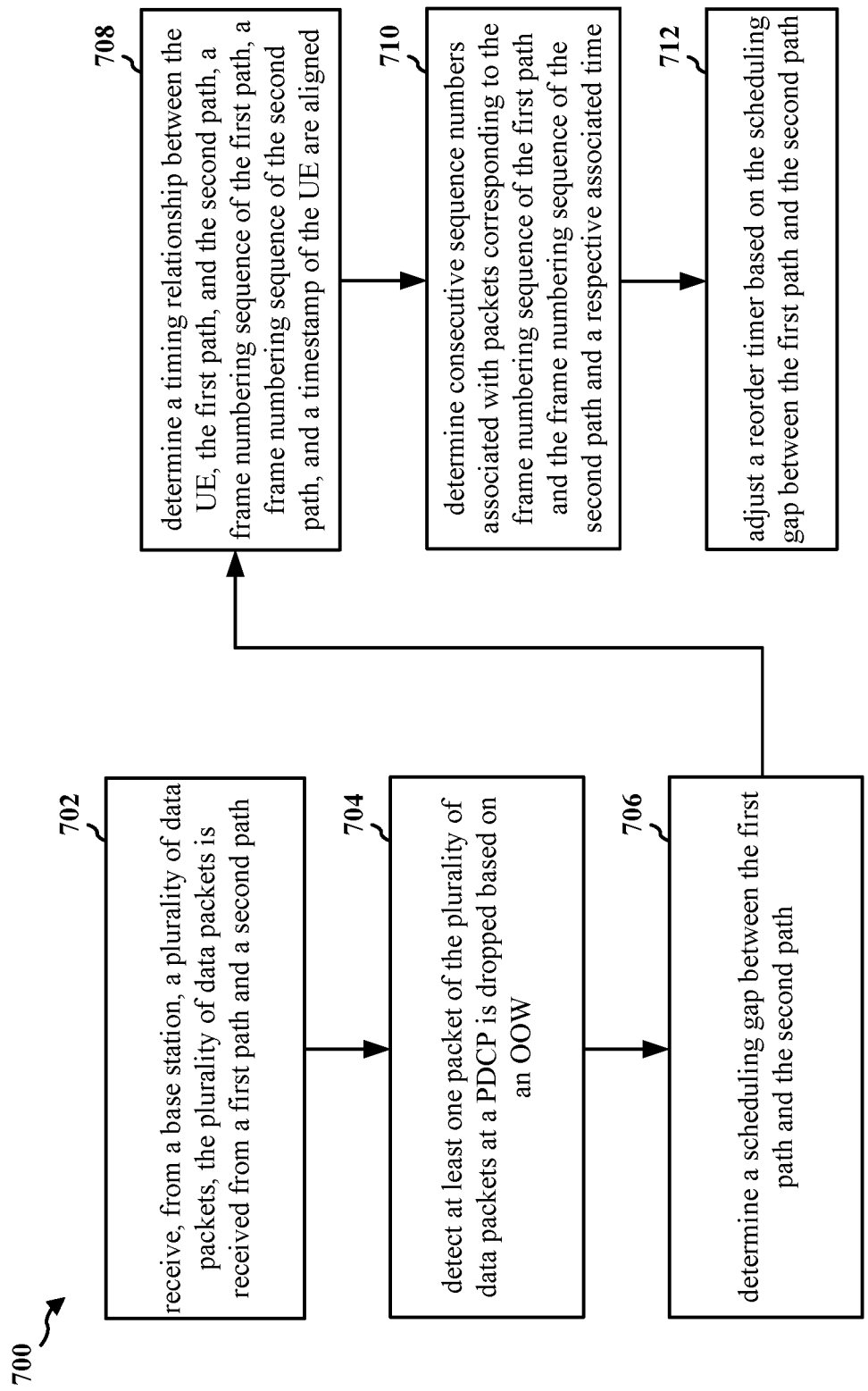
FIG. 7 is a flowchart of a method of wireless communication.

FIG. 7 is a flowchart 700 of a method of wireless communication. The method may be performed by a UE or a component of a UE (e.g., the UE 104; the apparatus 902; the cellular baseband processor 904, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may allow a UE to adjust a PDCP reorder timer based on scheduler variations in dual connectivity.

At 702, the UE may receive a plurality of data packets. For example, 702 may be performed by data packet component 940 of apparatus 902. The UE may receive the plurality of data packets from a base station. The plurality of data packets may be received from a first path and a second path. In some aspects, the first path and/or the second path may comprise at least one of a RAT, a CC, a band, or a leg. In the context of FIG. 6, the UE 602 may receive a plurality of data packets 606, where the plurality of data packets 606 may be received from a first path and a second path.

At 704, the UE may detect at least one packet of the plurality of data packets being dropped. For example, 704 may be performed by dropped packet component 942 of apparatus 902. The UE may detect at least one packet of the plurality of data packets at a PDCP being dropped. The at least one packet may be dropped at the PDCP based on an OOW. In some aspects, the at least one packet may be dropped based on the OOW in response to an expiration of a reorder timer. The reorder timer may be started in response to receiving at least one packet out of sequence. The reorder timer may provide a period of time to allow for receipt of a missing packet to complete a sequence of packets. In the context of FIG. 6, the UE 602, at 608, may detect at least one packet dropped at the PDCP based on an OOW.

At 706, the UE may determine a scheduling gap between the first path and the second path. For example, 706 may be performed by schedule gap component 944 of apparatus 902. In some aspects, the scheduling gap between the first path and the second path may be based on a consecutive sequence number of the packets corresponding to a frame numbering sequence of the first path and the frame numbering sequence of the second path and a respective associated time. The respective associated time may correspond to a timestamp of the UE. In some aspects, the consecutive sequence numbers associated with packets corresponding to the first path and the second path with respect to a local time or timestamp of the UE may indicate a schedule gap from an inter-RAT perspective. For example, the inter-RAT perspective may comprise the first path and the second path. In some aspects, the scheduling gap between the first path and the second path is dynamic. As such, the scheduling gap may increase or decrease over time. In the context of FIG. 6, the UE 602, at 610, may determine a scheduling gap between the first path and the second path.

At 708, to determine the scheduling gap between the first path and the second path, the UE may determine a timing relationship between the UE, the first path, and the second path. For example, 708 may be performed by timing component 946 of apparatus 902. The timing relationship may be determined in instances where a frame numbering sequence of the first path, a frame numbering sequence of the second path, and the timestamp or local time of the UE are aligned. In some aspects, the frame numbering sequence of the first path may be different from at least the frame numbering sequence of the second path or the timestamp or local time of the UE. In some aspects, the first path, the second path, and/or the UE may utilize different timing mechanisms that may not be aligned, synchronized, similar, or compatible. In such instances, receipt of data packets from the first path or second path may be sequential, but may appear to be out of order or sequence due in part to the first path and second path utilizing different timing mechanisms. In the context of FIG. 6, the UE 602, at 612, may determine a timing relationship between the UE, the first path, and the second path, where the frame numbering sequence of the first path, the frame numbering sequence of the second path, and a timestamp of the UE 602 are aligned.

At 710, the UE may determine consecutive sequence numbers. For example, 710 may be performed by sequence component 950 of apparatus 902. The UE, to further determine the timing relationship between the UE, the first path, and the second path, may determine the consecutive sequence numbers associated with packets corresponding to the frame numbering sequence of the first path, the frame numbering sequence of the second path, and a respective associated time. In the context of FIG. 6, the UE 602, at 616, may determine consecutive sequence numbers associated with packets corresponding to frame numbering sequence of the first path and second path, and a respective associate time.

At 712, the UE may adjust a reorder timer. For example, 712 may be performed by adjust component 952 of apparatus 902. The UE may adjust the reorder timer based on the scheduling gap between the first path and the second path. In some aspects, the adjustment of the reorder timer may be dynamic. As such, the adjustment of the reorder timer may increase or may decrease over time. The adjustment of the reorder timer allows the UE to extend the expiration of the reorder timer to allow for scheduling and/or transmission variations between the first path and the second path, which may reduce and/or avoid lost or dropped packets at the PDCP based on the OOW. The adjustment of the reorder time may allow for the delivery of out of sequence packets to be delivered to upper layers, which may reduce packet loss and increase radio resource and/or spectral efficiency at the UE side. In addition, adjusting the reorder timer may assist in avoiding excessive retransmissions due to dropped packets at the PDCP and improve overall throughput.

Figure 8:
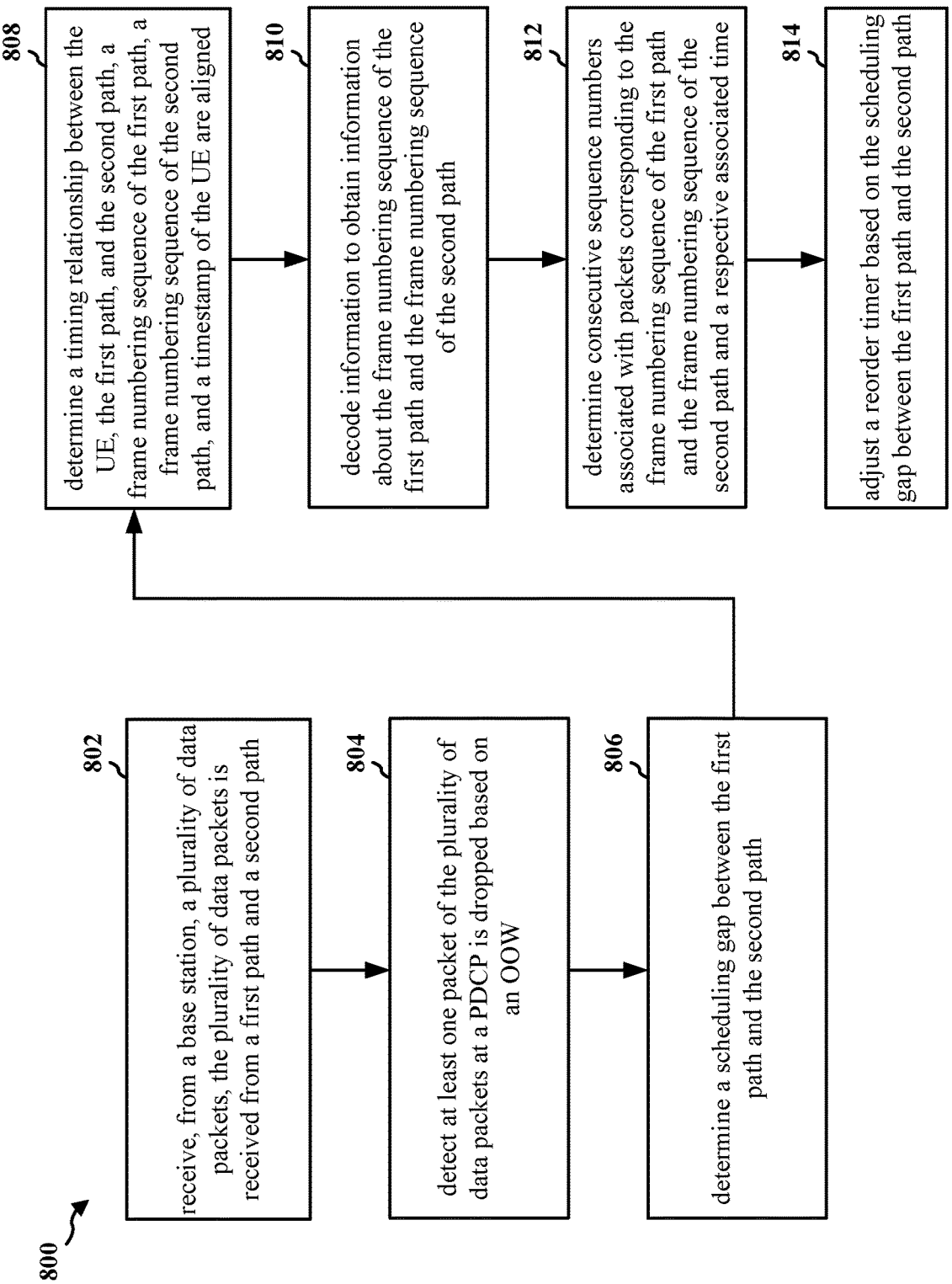
FIG. 8 is a flowchart of a method of wireless communication.

FIG. 8 is a flowchart 800 of a method of wireless communication. The method may be performed by a UE or a component of a UE (e.g., the UE 104; the apparatus 902; the cellular baseband processor 904, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to adjust a PDCP reorder timer based on scheduler variations in dual connectivity.

At 802, the UE may receive a plurality of data packets. For example, 802 may be performed by data packet component 940 of apparatus 902. The UE may receive the plurality of data packets from a base station. The plurality of data packets may be received from a first path and a second path. In some aspects, the first path and/or the second path may comprise at least one of a RAT, a CC, a band, or a leg. In the context of FIG. 6, the UE 602 may receive a plurality of data packets 606, where the plurality of data packets 606 may be received from a first path and a second path.

At 804, the UE may detect at least one packet of the plurality of data packets being dropped. For example, 804 may be performed by dropped packet component 942 of apparatus 902. The UE may detect at least one packet of the plurality of data packets at a PDCP being dropped. The at least one packet may be dropped at the PDCP based on an OOW. In some aspects, the at least one packet may be dropped based on the OOW in response to an expiration of a reorder timer. The reorder timer may be started in response to receiving at least one packet out of sequence. The reorder timer may provide a period of time to allow for receipt of a missing packet to complete a sequence of packets. In the context of FIG. 6, the UE 602, at 608, may detect at least one packet dropped at the PDCP based on an OOW.

At 806, the UE may determine a scheduling gap between the first path and the second path. For example, 806 may be performed by schedule gap component 944 of apparatus 902. In some aspects, the scheduling gap between the first path and the second path may be based on a consecutive sequence number of the packets corresponding to a frame numbering sequence of the first path and the frame numbering sequence of the second path and a respective associated time. The respective associated time may correspond to a timestamp of the UE. In some aspects, the consecutive sequence numbers associated with packets corresponding to the first path and the second path with respect to a local time or timestamp of the UE may indicate a schedule gap from an inter-RAT perspective. For example, the inter-RAT perspective may comprise the first path and the second path. In some aspects, the scheduling gap between the first path and the second path is dynamic. As such, the scheduling gap may increase or decrease over time. In the context of FIG. 6, the UE 602, at 610, may determine a scheduling gap between the first path and the second path.

At 808, to determine the scheduling gap between the first path and the second path, the UE may determine a timing relationship between the UE, the first path, and the second path. For example, 808 may be performed by timing component 946 of apparatus 902. The timing relationship may be determined in instances where a frame numbering sequence of the first path, a frame numbering sequence of the second path, and the timestamp or local time of the UE are aligned. In some aspects, the frame numbering sequence of the first path may be different from at least the frame numbering sequence of the second path or the timestamp or local time of the UE. In some aspects, the first path, the second path, and/or the UE may utilize different timing mechanisms that may not be aligned, synchronized, similar, or compatible. In such instances, receipt of data packets from the first path or second path may be sequential, but may appear to be out of order or sequence due in part to the first path and second path utilizing different timing mechanisms. In the context of FIG. 6, the UE 602, at 612, may determine a timing relationship between the UE, the first path, and the second path, where the frame numbering sequence of the first path, the frame numbering sequence of the second path, and a timestamp of the UE 602 are aligned.

At 810, to determine the timing relationship between the UE, the first path, and the second path, the UE may decode information transmitted by the base station to obtain relevant information related to the first path and/or the second path. For example, 810 may be performed by information component 948 of apparatus 902. In some aspects, to determine the timing relationship between the UE, the first path, and the second path, the UE may decode at least a MIB to obtain information about the frame numbering sequence of the first path and/or the frame numbering sequence of the second path. In some aspects, the information the UE may decode at least one of a SIB, physical channel information, or higher layer information to obtain the information about the frame numbering sequence of the first path and/or the frame numbering sequence of the second path. In some aspects, the timing relationship may be based on the frame numbering sequence of the first path and the frame numbering sequence of the second path. In the context of FIG. 6, the UE 602, at 614, may decode information (e.g., MIB, SIB, physical channel information, or higher layer information) transmitted by the base station 604 to obtain information about the frame numbering sequence of the first path and the second path. In some aspects, the information decoded by the UE 602 may be transmitted by the base station 604 within the data packets 606.

At 812, the UE may determine consecutive sequence numbers. For example, 812 may be performed by sequence component 950 of apparatus 902. The UE, to further determine the timing relationship between the UE, the first path, and the second path, may determine the consecutive sequence numbers associated with packets corresponding to the frame numbering sequence of the first path, the frame numbering sequence of the second path, and a respective associated time. In the context of FIG. 6, the UE 602, at 616, may determine consecutive sequence numbers associated with packets corresponding to frame numbering sequence of the first path and second path, and a respective associate time.

At 814, the UE may adjust a reorder timer. For example, 814 may be performed by adjust component 952 of apparatus 902. The UE may adjust the reorder timer based on the scheduling gap between the first path and the second path. In some aspects, the adjustment of the reorder timer may be dynamic. As such, the adjustment of the reorder timer may increase or may decrease over time. The adjustment of the reorder timer allows the UE to extend the expiration of the reorder timer to allow for scheduling and/or transmission variations between the first path and the second path, which may reduce and/or avoid lost or dropped packets at the PDCP based on the OOW. The adjustment of the reorder time may allow for the delivery of out of sequence packets to be delivered to upper layers, which may reduce packet loss and increase radio resource and/or spectral efficiency at the UE side. In addition, adjusting the reorder timer may assist in avoiding excessive retransmissions due to dropped packets at the PDCP and improve overall throughput.

Figure 9:
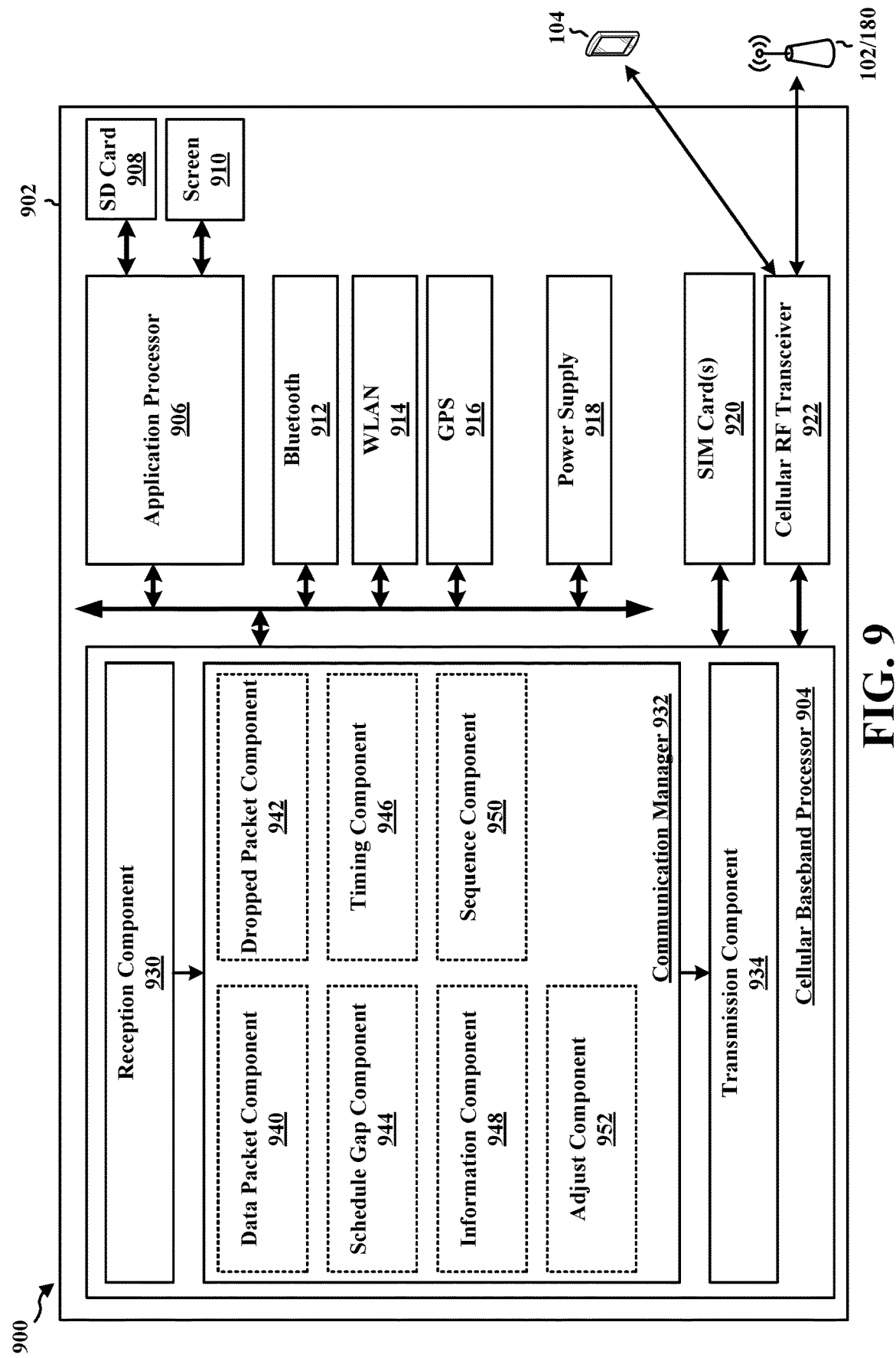
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the cellular baseband processor 904, and in another configuration, the apparatus 902 may be the entire UE (e.g., see 350 of FIG. 3) and include the aforediscussed additional modules of the apparatus 902.

The communication manager 932 includes a data packet component 940 that is configured to receive a plurality of data packets, e.g., as described in connection with 702 of FIG. 7 or 802 of FIG. 8. The communication manager 932 further includes a dropped packet component 942 that is configured to detect at least one packet of the plurality of data packets being dropped, e.g., as described in connection with 704 of FIG. 7 or 804 of FIG. 8. The communication manager 932 further includes a schedule gap component 944 that is configured to determine a scheduling gap between the first path and the second path, e.g., as described in connection with 706 of FIG. 7 or 806 of FIG. 8. The communication manager 932 further includes a timing component 946 that is configured to determine a timing relationship between the UE, the first path, and the second path, e.g., as described in connection with 708 of FIG. 7 or 808 of FIG. 8. The communication manager 932 further includes an information component 948 that is configured to decode information transmitted by the base station to obtain relevant information related to the first path and/or the second path, e.g., as described in connection with 810 of FIG. 8. The communication manager 932 further includes a sequence component 950 that is configured to determine consecutive sequence numbers, e.g., as described in connection with 710 of FIG. 7 or 812 of FIG. 8. The communication manager 932 further includes an adjust component 952 that is configured to adjust a reorder timer, e.g., as described in connection with 712 of FIG. 7 or 814 of FIG. 8.

The apparatus may include additional components that perform each of the blocks of the algorithm in the aforementioned flowcharts of FIG. 7 or 8. As such, each block in the aforementioned flowcharts of FIG. 7 or 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for receiving, from a base station, a plurality of data packets. The plurality of data packets is received from a first path and a second path. The apparatus includes means for detecting at least one packet of the plurality of data packets at a PDCP is dropped based on OOW. The apparatus includes means for determining a scheduling gap between the first path and the second path. The means for determining the scheduling gap between the first path and the second path configured to determine a timing relationship between the UE, the first path, and the second path. A frame numbering sequence of the first path, a frame numbering sequence of the second path, and a timestamp of the UE are aligned. The means for determining the scheduling gap between the first path and the second path configured to determine consecutive sequence numbers associated with packets corresponding to the frame numbering sequence of the first path and the frame numbering sequence of the second path and a respective associated time. The apparatus includes means for adjusting a reorder timer based on the scheduling gap between the first path and the second path. The apparatus further includes means for decoding at least a MIB to obtain information about the frame numbering sequence of the first path and the frame numbering sequence of the second path. The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to receive, from a base station, a plurality of data packets, wherein the plurality of data packets is received from a first path and a second path; detect at least one packet of the plurality of data packets at a PDCP is dropped based on an OOW; determine a scheduling gap between the first path and the second path, wherein to determine the scheduling gap between the first path and the second path the at least one processor is further configured to determine a timing relationship between the UE, the first path, and the second path, wherein a frame numbering sequence of the first path, a frame numbering sequence of the second path, and a timestamp of the UE are aligned; determine consecutive sequence numbers associated with packets corresponding to the frame numbering sequence of the first path and the frame numbering sequence of the second path and a respective associated time; and adjust a reorder timer based on the scheduling gap between the first path and the second path.

Aspect 2 is the apparatus of Aspect 1, further includes a transceiver coupled to the at least one processor.

Aspect 3 is the apparatus of any of Aspects 1 and 2, further includes that to determine the timing relationship between the UE, the first path, and the second path the at least one processor is further configured to decode at least a MIB to obtain information about the frame numbering sequence of the first path and the frame numbering sequence of the second path.

Aspect 4 is the apparatus of any of Aspects 1-3, further includes that the UE decodes at least one of a SIB, physical channel information, or higher layer information to obtain the information about the frame numbering sequence of the first path and the frame numbering sequence of the second path.

Aspect 5 is the apparatus of any of Aspects 1-4, further includes that the timing relationship is based on the frame numbering sequence of the first path and the frame numbering sequence of the second path.

Aspect 6 is the apparatus of any of Aspects 1-5, further includes that the scheduling gap between the first path and the second path is based on the consecutive sequence number of the packets corresponding to the frame numbering sequence of the first path and the frame numbering sequence of the second path and the respective associated time.

Aspect 7 is the apparatus of any of Aspects 1-6, further includes that consecutive sequence numbers associated with packets corresponding to the first path and the second path with respect to a local time of the UE indicates a schedule gap from an inter-RAT perspective.

Aspect 8 is the apparatus of any of Aspects 1-7, further includes that the at least one packet is dropped based on the OOW in response to an expiration of the reorder timer.

Aspect 9 is the apparatus of any of Aspects 1-8, further includes that the reorder timer is started in response to receiving at least one packet out of sequence, wherein the reorder timer allows a period of time to allow for receipt of a missing packet to complete a sequence of packets.

Aspect 10 is the apparatus of any of Aspects 1-9, further includes that the scheduling gap between the first path and the second path is dynamic, such that the scheduling gap increases or decreases over time.

Aspect 11 is the apparatus of any of Aspects 1-10, further includes that adjustment of the reorder timer is dynamic, such that the adjustment of the reorder timer increases or decreases over time.

Aspect 12 is the apparatus of any of Aspects 1-11, further includes that the first path or the second path comprises at least one of a RAT, a CC, a band, or a leg.

Aspect 13 is a method of wireless communication for implementing any of Aspects 1-12.

Aspect 14 is an apparatus for wireless communication including means for implementing any of Aspects 1-12.

Aspect 15 is a computer-readable medium storing computer executable code, where the code when executed by a processor causes the processor to implement any of Aspects 1-12.

What is claimed is:

1. An apparatus for wireless communication at a user equipment (UE), comprising:
    a memory; and
    at least one processor coupled to the memory and configured to:
        receive, from a base station, a plurality of data packets, wherein the plurality of data packets is received from a first path and a second path;
        detect at least one packet of the plurality of data packets at a packet data convergence protocol (PDCP) is dropped based on an out of order window (OOW);
        determine a scheduling gap between the first path and the second path, wherein to determine the scheduling gap between the first path and the second path the at least one processor is further configured to:
            determine a timing relationship between the UE, the first path, and the second path, wherein a frame numbering sequence of the first path, a frame numbering sequence of the second path, and a timestamp of the UE are aligned; and
            determine consecutive sequence numbers associated with packets corresponding to the frame numbering sequence of the first path and the frame numbering sequence of the second path and a respective associated time; and
        adjust a reorder timer based on the scheduling gap between the first path and the second path.

2. The apparatus of claim 1, further comprising a transceiver coupled to the at least one processor.

3. The apparatus of claim 1, wherein to determine the timing relationship between the UE, the first path, and the second path the at least one processor is further configured to:
    decode at least a master information block (MIB) to obtain information about the frame numbering sequence of the first path and the frame numbering sequence of the second path.

4. The apparatus of claim 3, wherein the UE decodes at least one of a system information block (SIB), physical channel information, or higher layer information to obtain the information about the frame numbering sequence of the first path and the frame numbering sequence of the second path.

5. The apparatus of claim 1, wherein the timing relationship is based on the frame numbering sequence of the first path and the frame numbering sequence of the second path.

6. The apparatus of claim 1, wherein the scheduling gap between the first path and the second path is based on the consecutive sequence number of the packets corresponding to the frame numbering sequence of the first path and the frame numbering sequence of the second path and the respective associated time.

7. The apparatus of claim 1, wherein consecutive sequence numbers associated with packets corresponding to the first path and the second path with respect to a local time of the UE indicates a schedule gap from an inter-RAT perspective.

8. The apparatus of claim 1, wherein the at least one packet is dropped based on the OOW in response to an expiration of the reorder timer.

9. The apparatus of claim 8, wherein the reorder timer is started in response to receiving at least one packet out of sequence, wherein the reorder timer allows a period of time to allow for receipt of a missing packet to complete a sequence of packets.

10. The apparatus of claim 1, wherein the scheduling gap between the first path and the second path is dynamic, such that the scheduling gap increases or decreases over time.

11. The apparatus of claim 1, wherein adjustment of the reorder timer is dynamic, such that the adjustment of the reorder timer increases or decreases over time.

12. The apparatus of claim 1, wherein the first path or the second path comprises at least one of a radio access technology (RAT), a component carrier (CC), a band, or a leg.

13. A method of wireless communication at a user equipment (UE), comprising:
    receiving, from a base station, a plurality of data packets, wherein the plurality of data packets is received from a first path and a second path;
    detecting at least one packet of the plurality of data packets at a packet data convergence protocol (PDCP) is dropped based on an out of order window (OOW);
    determining a scheduling gap between the first path and the second path, wherein determining the scheduling gap between the first path and the second path further comprising:
        determining a timing relationship between the UE, the first path, and the second path, wherein a frame numbering sequence of the first path, a frame numbering sequence of the second path, and a timestamp of the UE are aligned; and
        determining consecutive sequence numbers associated with packets corresponding to the frame numbering sequence of the first path and the frame numbering sequence of the second path and a respective associated time; and
    adjusting a reorder timer based on the scheduling gap between the first path and the second path.

14. The method of claim 13, wherein the determining the timing relationship between the UE, the first path, and the second path comprises:
    decoding at least a master information block (MIB) to obtain information about the frame numbering sequence of the first path and the frame numbering sequence of the second path.

15. The method of claim 14, wherein the UE decodes at least one of a system information block (SIB), physical channel information, or higher layer information to obtain the information about the frame numbering sequence of the first path and the frame numbering sequence of the second path.

16. The method of claim 13, wherein the timing relationship is based on the frame numbering sequence of the first path and the frame numbering sequence of the second path.

17. The method of claim 13, wherein the scheduling gap between the first path and the second path is based on the consecutive sequence number of the packets corresponding to the frame numbering sequence of the first path and the frame numbering sequence of the second path and the respective associated time.

18. The method of claim 13, wherein consecutive sequence numbers associated with packets corresponding to the first path and the second path with respect to a local time of the UE indicates a schedule gap from an inter-RAT perspective.

19. The method of claim 13, wherein the at least one packet is dropped based on the OOW in response to an expiration of the reorder timer.

20. The method of claim 19, wherein the reorder timer is started in response to receiving at least one packet out of sequence, wherein the reorder timer allows a period of time to allow for receipt of a missing packet to complete a sequence of packets.

21. The method of claim 13, wherein the scheduling gap between the first path and the second path is dynamic, such that the scheduling gap increases or decreases over time.

22. The method of claim 13, wherein adjustment of the reorder timer is dynamic, such that the adjustment of the reorder timer increases or decreases over time.

23. The method of claim 13, wherein the first path or the second path comprises at least one of a radio access technology (RAT), a component carrier (CC), a band, or a leg.

24. An apparatus for wireless communication at a user equipment (UE), comprising:
  means for receiving, from a base station, a plurality of data packets, wherein the plurality of data packets is received from a first path and a second path;
  means for detecting at least one packet of the plurality of data packets at a packet data convergence protocol (PDCP) is dropped based on an out of order window (OOW);
  means for determining a scheduling gap between the first path and the second path, wherein the means for determining the scheduling gap between the first path and the second path further configured to:
    determine a timing relationship between the UE, the first path, and the second path, wherein a frame numbering sequence of the first path, a frame numbering sequence of the second path, and a timestamp of the UE are aligned; and
    determine consecutive sequence numbers associated with packets corresponding to the frame numbering sequence of the first path and the frame numbering sequence of the second path and a respective associated time; and
  means for adjusting a reorder timer based on the scheduling gap between the first path and the second path.

25. The apparatus of claim 24, wherein to determine the timing relationship between the UE, the first path, and the second path the apparatus is configured to:
  decode at least a master information block (MIB) to obtain information about the frame numbering sequence of the first path and the frame numbering sequence of the second path.

26. The apparatus of claim 24, wherein the timing relationship is based on the frame numbering sequence of the first path and the frame numbering sequence of the second path.

27. The apparatus of claim 24, wherein the scheduling gap between the first path and the second path is based on the consecutive sequence number of the packets corresponding to the frame numbering sequence of the first path and the frame numbering sequence of the second path and the respective associated time.

28. The apparatus of claim 24, wherein consecutive sequence numbers associated with packets corresponding to the first path and the second path with respect to a local time of the UE indicates a schedule gap from an inter-RAT perspective.

29. The apparatus of claim 24, wherein the at least one packet is dropped based on the OOW in response to an expiration of the reorder timer.

30. A computer-readable medium storing computer executable code, the code when executed by a processor causes the processor to:
  receive, from a base station, a plurality of data packets, wherein the plurality of data packets is received from a first path and a second path;
  detect at least one packet of the plurality of data packets at a packet data convergence protocol (PDCP) is dropped based on an out of order window (OOW);
  determine a scheduling gap between the first path and the second path, wherein to determine the scheduling gap between the first path and the second path the code further causes the processor to:
    determine a timing relationship between a user equipment (UE), the first path, and the second path, wherein a frame numbering sequence of the first path, a frame numbering sequence of the second path, and a timestamp of the UE are aligned; and
    determine consecutive sequence numbers associated with packets corresponding to the frame numbering sequence of the first path and the frame numbering sequence of the second path and a respective associated time; and
  adjust a reorder timer based on the scheduling gap between the first path and the second path.

* * * * *